(12) United States Patent
Yoshikawa

(10) Patent No.: US 11,760,401 B2
(45) Date of Patent: Sep. 19, 2023

(54) CARRIER

(71) Applicant: Kabushiki Kaisha Yoshikawakuni Kogyosho, Nara-ken (JP)

(72) Inventor: Toshiyuki Yoshikawa, Nara-ken (JP)

(73) Assignee: KABUSHIKI KAISHA YOSHIKAWAKUNI KOGYOSHO, Nara-ken (JP)

(*) Notice: Subject to any disclaimer, the term of this patent is extended or adjusted under 35 U.S.C. 154(b) by 0 days.

(21) Appl. No.: 17/519,939

(22) Filed: Nov. 5, 2021

(65) Prior Publication Data

US 2023/0001974 A1    Jan. 5, 2023

(51) Int. Cl.
*B62B 3/14* (2006.01)
*B62B 5/06* (2006.01)
*B62B 3/02* (2006.01)

(52) U.S. Cl.
CPC .............. *B62B 3/1476* (2013.01); *B62B 3/02* (2013.01); *B62B 5/061* (2013.01)

(58) Field of Classification Search
CPC .......... B62B 3/1476; B62B 3/02; B62B 5/061
See application file for complete search history.

(56) References Cited

U.S. PATENT DOCUMENTS

| | | | | |
|---|---|---|---|---|
| 4,998,023 A * | 3/1991 | Kitts | ........................ | B62B 3/02 280/47.35 |
| 6,796,565 B2 * | 9/2004 | Choi | ........................ | B62B 3/02 280/47.35 |
| 9,421,835 B2 * | 8/2016 | Kao | ...................... | A63C 17/265 |
| D800,483 S | 10/2017 | Innes | | |
| 9,988,062 B2 * | 6/2018 | Stahl | ........................ | B62B 3/16 |
| 2009/0184078 A1 * | 7/2009 | Lee | ........................ | A47B 57/54 211/187 |
| 2016/0137011 A1 * | 5/2016 | Kao | ........................ | B60D 1/04 280/412 |
| 2022/0212702 A1 * | 7/2022 | Chang | ........................ | B62B 5/00 |

FOREIGN PATENT DOCUMENTS

| | | | | |
|---|---|---|---|---|
| CN | 108639124 A | * | 10/2018 | ............... B62B 3/02 |
| FR | 2778619 A1 | * | 11/1999 | ............. B62B 3/002 |
| GB | 2458115 A | * | 9/2009 | ............... B62B 3/02 |
| JP | D858331 | | 1/1993 | |
| JP | 2000289624 A | * | 10/2000 | |
| JP | 2009-61947 A | | 3/2009 | |

(Continued)

*Primary Examiner* — James A Shriver, II
*Assistant Examiner* — Michael T. Walsh
(74) *Attorney, Agent, or Firm* — Vedder Price P.C.

(57) ABSTRACT

Provided is a carrier including a handle and a load-carrying platform, which enables construction of a multi-tier assembly. A carrier includes caster mounting portions formed on a lower surface of a load-carrying platform, a handle that extends outward from a first side edge portion of the load-carrying platform and has an upper surface with an engaged portion being one of a recess and a through hole, and an engaging portion that projects downward from a lower surface of a second side edge portion opposed to the first side edge portion and is engageable with the engaged portion. Connection of a plurality of carriers achieves an integral and flat placement surface composed of placement surfaces, each being the upper surface of the load-carrying platform of the carrier.

5 Claims, 17 Drawing Sheets

(56) References Cited

FOREIGN PATENT DOCUMENTS

| JP | 2009061947 A | * | 3/2009 | | |
| JP | 2011230761 A | * | 11/2011 | | |
| WO | WO-2017007106 A1 | * | 1/2017 | ............... | B62B 3/02 |
| WO | WO-2017116682 A1 | * | 7/2017 | ............... | B62B 3/02 |
| WO | WO-2019076174 A1 | * | 4/2019 | | |

* cited by examiner (a)

(b)

CARRIER

BACKGROUND OF THE INVENTION

1. Field of the Invention

The present invention relates generally to a carrier, and more particularly, to a carrier having functions to form a wagon when connected to at least one identical carrier.

2. Description of the Related Art

Related-art carriers include a flatbed trolley including a handle and a placement base. The handle extends vertically upward with respect to the placement base on which a load is to be placed.

When a single related-art flatbed trolley is used, an area of a placement surface is sometimes insufficient. In order to expand the placement surface, a flatbed trolley having the following structure is disclosed in Japanese Patent Application Laid-open No. 2009-61947. The flatbed trolley can be coupled to another identical flatbed trolley to achieve a large placement surface. The flatbed trolley includes a handle, which is a flatbed trolley accessory and is attached so as to be removable as needed. As exemplified in Japanese Patent Application Laid-open No. 2009-61947, however, the handle extends vertically upward with respect to the placement surface. Such a handle restricts a direction of connecting of the flatbed trolleys, allowing no flexibility in combination of the flatbed trolleys.

Further, it is not easy to carry the placement base alone without the handle. Thus, the placement surface may have grip holes for carrying the placement base as described in Japanese Patent Application Laid-open No. 2009-61947. In this case, when the flatbed trolley is used to transport a load, the grip holes cannot be closed even temporarily so as to be able to function as a substitute for a handle as needed. Thus, a small load may be dropped through the grip hole.

In view of this, as means to solve the above-mentioned problem, according to the present invention, there is provided a carrier, including: a load-carrying platform having a plate-like shape with a flat upper surface and a lower surface; caster mounting portions formed on the lower surface of the load-carrying platform; a handle that extends outward from a first side edge portion of the load-carrying platform, and has an upper surface with an engaged portion being one of a recess and a through hole; and an engaging portion that projects downward from a lower surface of a second side edge portion opposed to the first side edge portion of the load-carrying platform and is engageable with the engaged portion.

It is preferred that the load-carrying platform have pillar vertical installation holes formed on the upper surface and pillar-head insertion holes formed on the lower surface. A plurality of carriers are connected together with use of pillar members that are inserted into the pillar vertical installation holes of the load-carrying platform of the carrier arranged at a lower level and the pillar-head insertion holes of the load-carrying platform of the carrier arranged at an upper level, thereby forming a multi-tier assembly.

The pillar vertical installation holes of the load-carrying platform may be closable by caps.

The carrier may include: a second handle that extends outward from a third side edge portion that is perpendicular to the first side edge portion with the handle and a horizontal plane including the upper surface of the load-carrying platform when viewed from a center of the horizontal plane; and a second engaging portion that projects downward from a lower surface of a fourth side edge portion opposed to the third side edge portion.

The caster mounting portions may be classified into: a first caster mounting portion group including first caster mounting portions arranged in a quadrangular pattern along a peripheral edge of the load-carrying platform; and a second caster mounting portion group including second caster mounting portions arranged in a quadrangular pattern on an inner side of the first caster mounting portion group.

SUMMARY OF THE INVENTION

According to one aspect of this disclosure, the carrier including the handle having functions and effects of enabling connection to another identical carrier can be achieved. Further, when a plurality of carriers according to the present invention are connected together by using the handle, the upper surfaces of the plurality of carriers connected together achieve an integral and flat placement surface.

According to another aspect of this disclosure, the engaging portion formed at the peripheral edge of the load-carrying platform and the engaged portion of the handle enable unrestricted connection of a plurality of load-carrying platforms in a horizontal direction and a fore-and-aft direction.

Further, a plurality of carriers can be assembled in a vertical direction to form a multi-tier wagon. A plurality of thus assembled wagons can also be connected together in the fore-and-aft direction and the horizontal direction through engagement between the engaging portions and the engaged portions.

DESCRIPTION OF THE EMBODIMENT

Now, an embodiment of the present invention is described in detail with reference to the accompanying drawings. Components having substantially the same functions and configurations are denoted by the same reference symbols in this specification and the drawings, and an overlapping description thereof is herein omitted.

Figure 1:
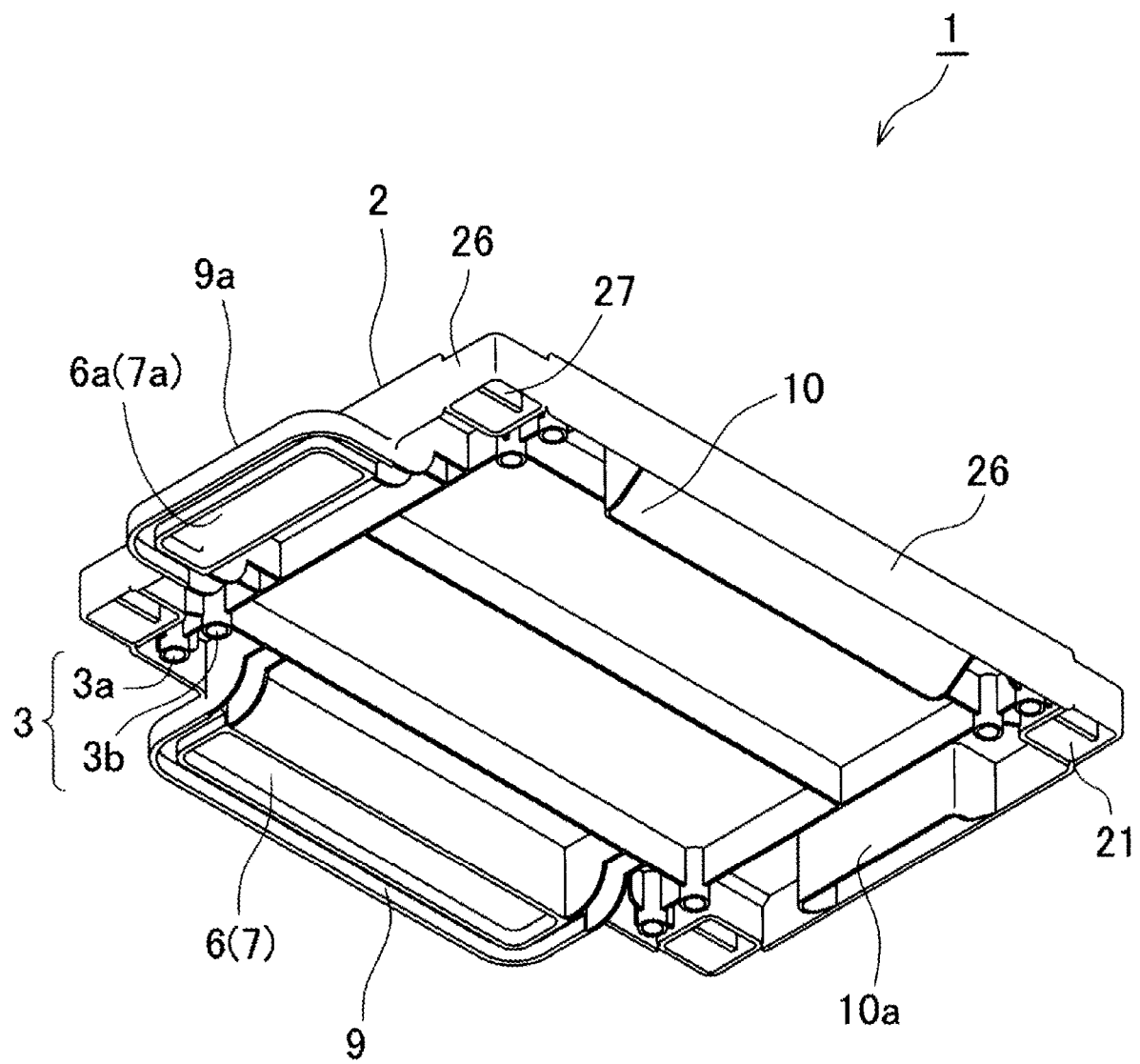
FIG. 1 is a perspective view of a carrier when viewed from diagonally below.

As exemplified in FIG. 1, a carrier 1 includes a load-carrying platform 2, caster mounting portions 3, and a handle 9. The caster mounting portions 3 are formed on a lower surface of the load-carrying platform 2. The handle 9 extends outward from a first side edge portion of the load-carrying platform 2. The handle 9 has a through hole 7 that allows fingers to be inserted when the carrier 1 is to be moved. Further, an engaging portion 10 that projects downward is formed on a lower surface of a second side edge portion of the load-carrying platform 2, which is opposed to the first side edge portion. When two carriers 1 are placed so that the load-carrying platforms 2 thereof are adjacent to each other, the engaging portion 10 formed on the load-carrying platform 2 of one of the carriers 1 is inserted into the through hole 7 of the handle 9 of another one of the carriers 1 to enable connection of the carriers 1. At the time of connection, the through hole 7 functions as an engaged portion 6 that is engageable with the engaging portion 10.

Figure 2:
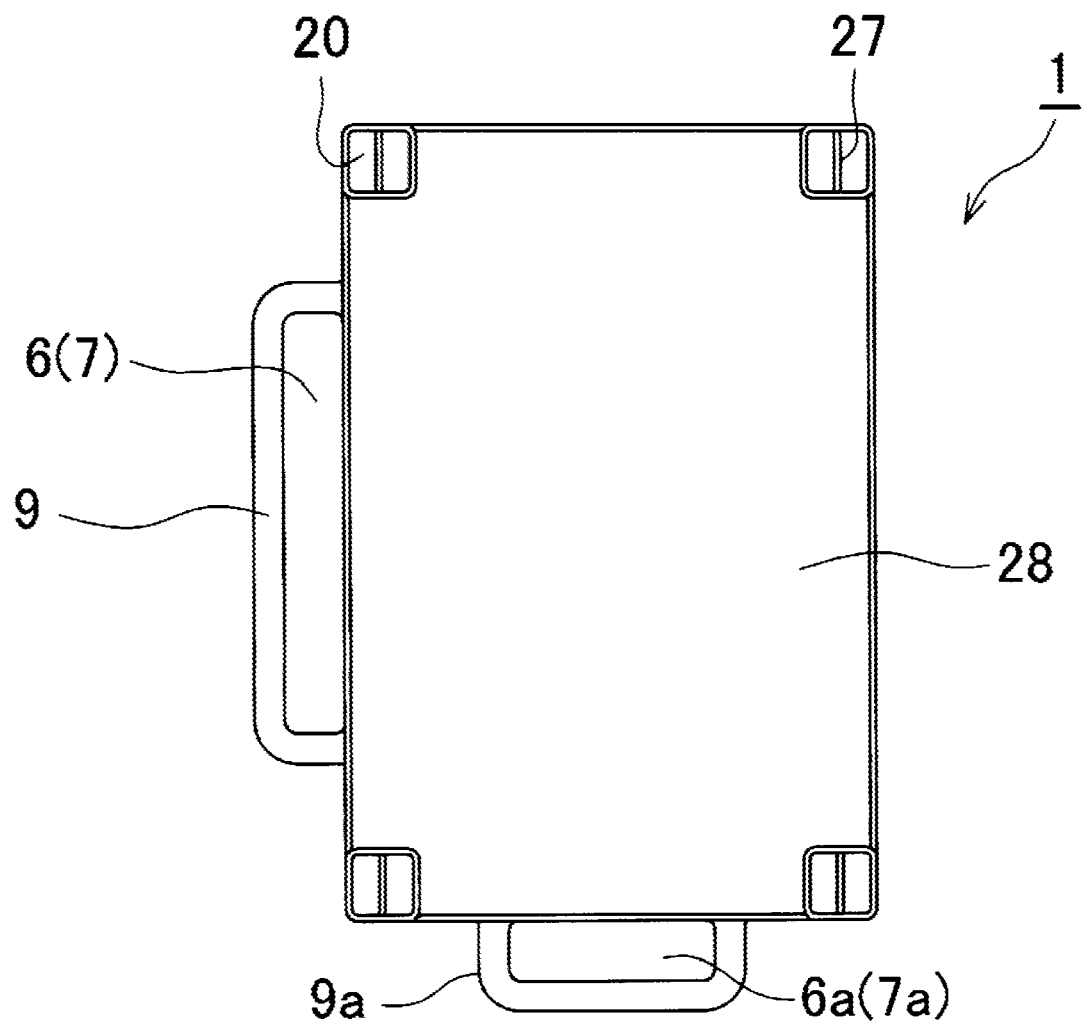
FIG. 2 is a top view of the carrier.
Figure 5:
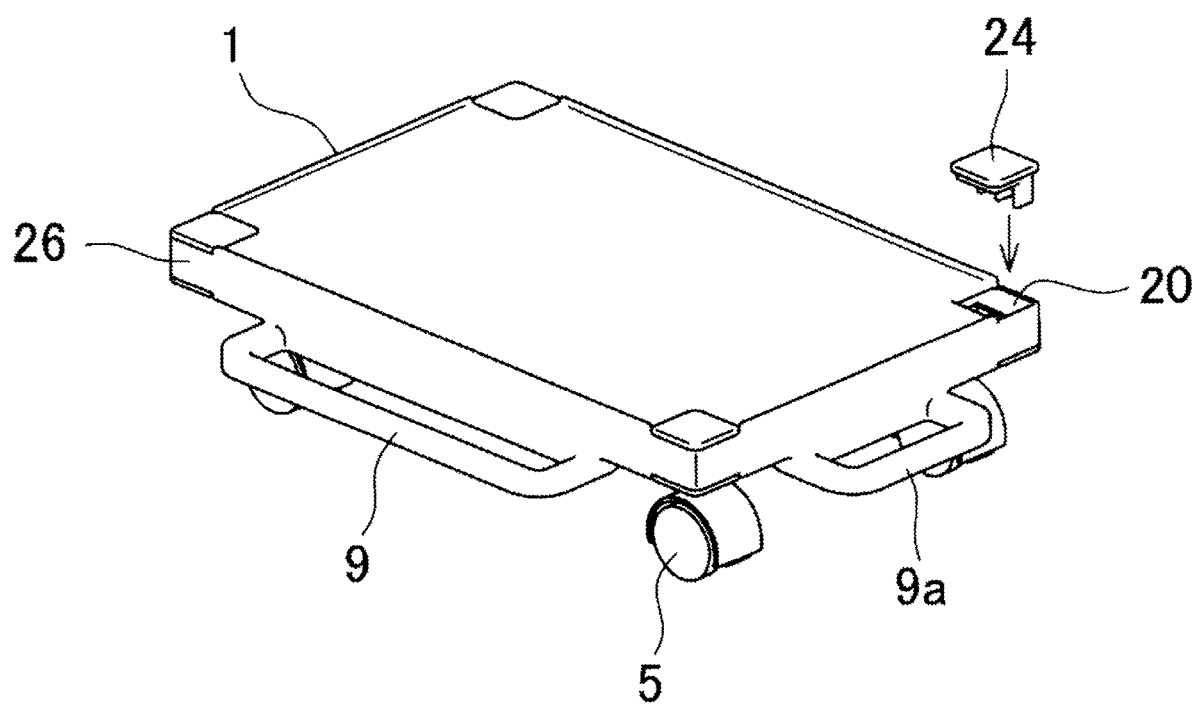
FIG. 5 is a perspective view for illustrating mounting of caps onto a placement surface of a load-carrying platform.

The load-carrying platform 2 is formed in a plate-like shape having a flat upper surface as a placement surface 28. According to this embodiment, as illustrated in FIG. 2, the load-carrying platform 2 has a rectangular shape in top view. The load-carrying platform 2 may be square or quadrilateral rectangular with opposed sides having the same length. When a plurality of carriers 1 are connected together, the rectangular shape of the load-carrying platform 2 enables side surfaces 26 of the load-carrying platforms 2 of the carriers 1, which are adjacent to each other, to be brought into close contact with each other. As a result, the placement surfaces 28 of the load-carrying platforms 2 form an integral placement surface. As illustrated in FIG. 1 and FIG. 5, the load-carrying platform 2 has the side surfaces 26 that extend downward from upper ends of side edge portions of the load-carrying platform 2 when the load-carrying platform 2 is viewed from above. The side surfaces 26 are structural portions that form the side edge portions of the load-carrying platform 2.

As illustrated in FIG. 1, the handle 9 extends outward beyond a lower end of one of the side surfaces 26 of the load-carrying platform 2. The handle 9 has the engaged portion 6, which is a recess or the through hole 7 formed in an upper surface. The handle 9 may be formed to extend beyond any of the side surfaces 26. Specifically, the handle 9 extends horizontally outward beyond a lower end of one of the side surfaces 26 of the load-carrying platform 2.

Further, as illustrated in FIG. 1, a second handle 9a may also be formed. The second handle 9a extends outward beyond a lower end of the side surface 26 that is perpendicular to the side surface 26 with the handle 9 and a horizontal plane including the upper surface of the load-carrying platform 2 when viewed from a center of the plane of the load-carrying platform 2. That is, the second handle 9a is formed to extend beyond the side surface 26 that is adjacent to the side surface 26 with the handle 9.

As another embodiment, the handle 9 may extend horizontally from an outer surface of one of the side surfaces 26. In this case, it is preferred that a cutout be formed in a lower end of the side surface 26 that is opposed to the side surface 26 with the handle 9 so that a position of the cutout corresponds to a position of the handle 9. This structure allows the handle 9 to be inserted into the cutout. The engaging portion 10 is formed on the lower surface of the load-carrying platform 2 so as to be located on an inner side of the cutout. As a result, a plurality of carriers 1 can be connected together.

Further, the handle 9 has the engaged portion 6 being the through hole 7, which is formed by molding. The engaged portion 6 may have any shape that allows engagement with the engaging portion 10, and is not required to be the through hole 7. For example, the engaged portion 6 may be a recess formed in the upper surface of the handle 9.

The second handle 9a has a second engaged portion 6a being a second through hole 7a, which is formed by molding. The second engaged portion 6a may have any shape that allows engagement with a second engaging portion 10a, and is not required to be the second through hole 7a. For example, the second engaged portion 6a may be a recess formed in an upper surface of the second handle 9a.

The engaging portion 10 is formed to project downward from the lower surface of the load-carrying platform 2. More specifically, the engaging portion 10 is formed to project downward beyond the lower end of one of the side surfaces 26 of the load-carrying platform 2 in such a tapered manner as to incline toward the center of the load-carrying platform 2. When another carrier 1 is moved closer to one longer side of the load-carrying platform 2 of the carrier 1, the handle 9 of the carrier 1 being moved is engaged with the engaging portion 10 of the carrier 1 to reach a root of the engaging portion 10 while sliding along an inclined surface of the engaging portion 10 having a tapered shape. Thus, the engaging portion 10 and the engaged portion 6 can easily be engaged with each other.

As illustrated in FIG. 1, the second engaging portion 10a may be formed to project downward beyond the side surface 26 that is opposed to the side surface 26 with the second handle 9a. The second engaging portion 10a is formed in such a tapered manner as to incline toward the center of the load-carrying platform 2.

Figure 8:
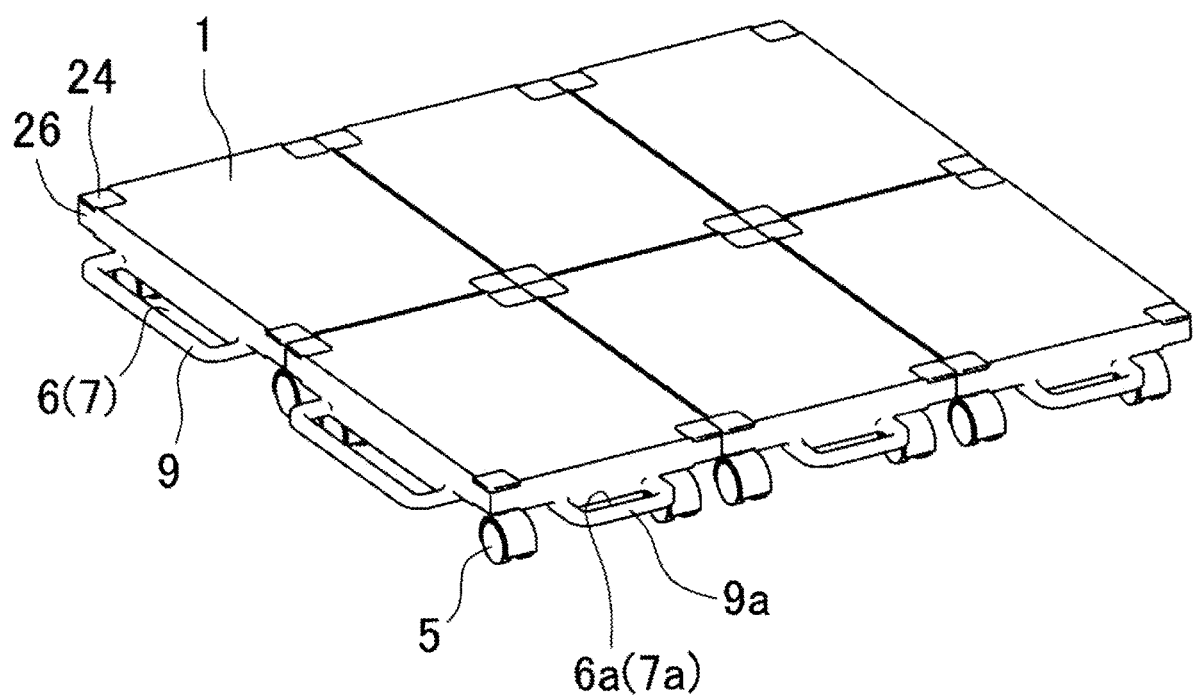
FIG. 8 is a view for illustrating a plurality of carriers connected together in the horizontal direction and a fore-and-aft direction.
Figure 9:
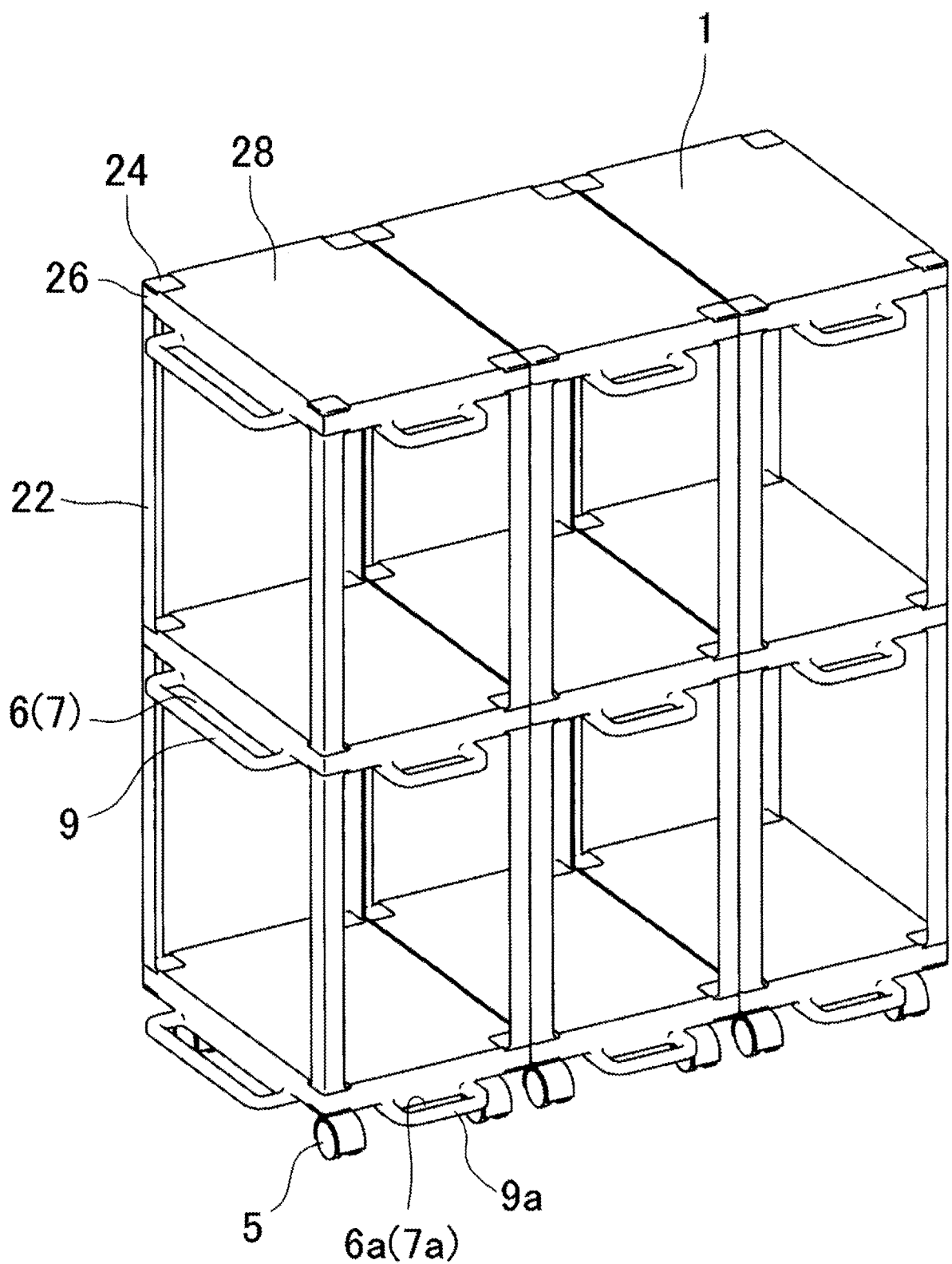
FIG. 9 is a view for illustrating a plurality of carriers connected together in the horizontal direction and the vertical direction.

When the engaging portion 10 of the carrier 1 according to the present invention is engaged with the engaged portion 6 of another carrier 1, the carriers 1 are connected together to form an integral and flat placement surface composed of two placement surfaces 28. Further, as illustrated in FIG. 8, according to this embodiment, a plurality of carriers 1 can be connected in both of a fore-and-aft direction and a horizontal direction without restriction. In this embodiment, the "fore-and-aft direction" is a direction in which the carriers 1 are connected together through engagement with the handle 9a, and the "horizontal direction" is a direction in which the carriers 1 are connected together through engagement with the handle 9.

Figure 6:
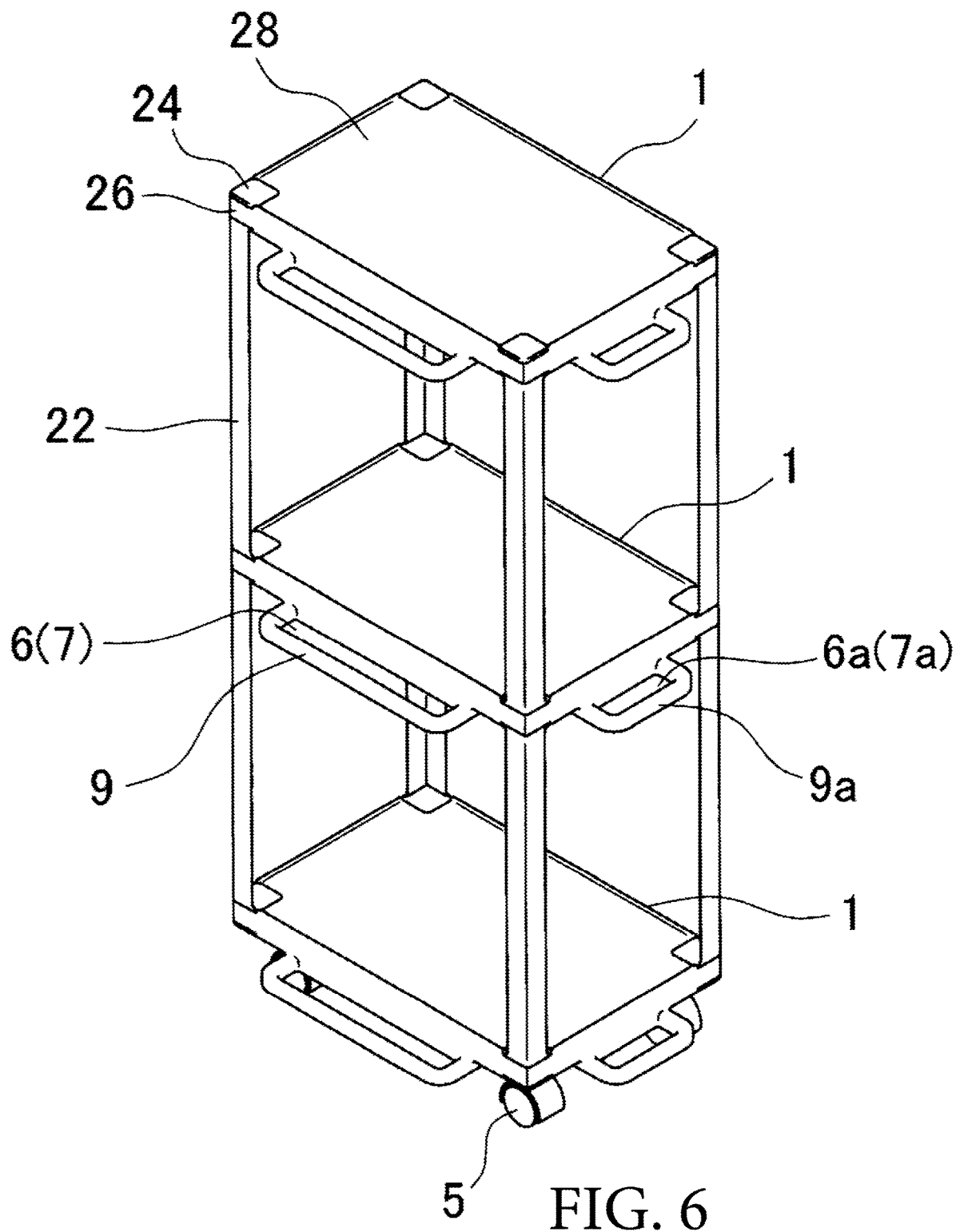
FIG. 6 is a perspective view for illustrating a state in which a plurality of carriers are assembled in a vertical direction with use of pillar members and casters into a multi-tier wagon.
Figure 7:
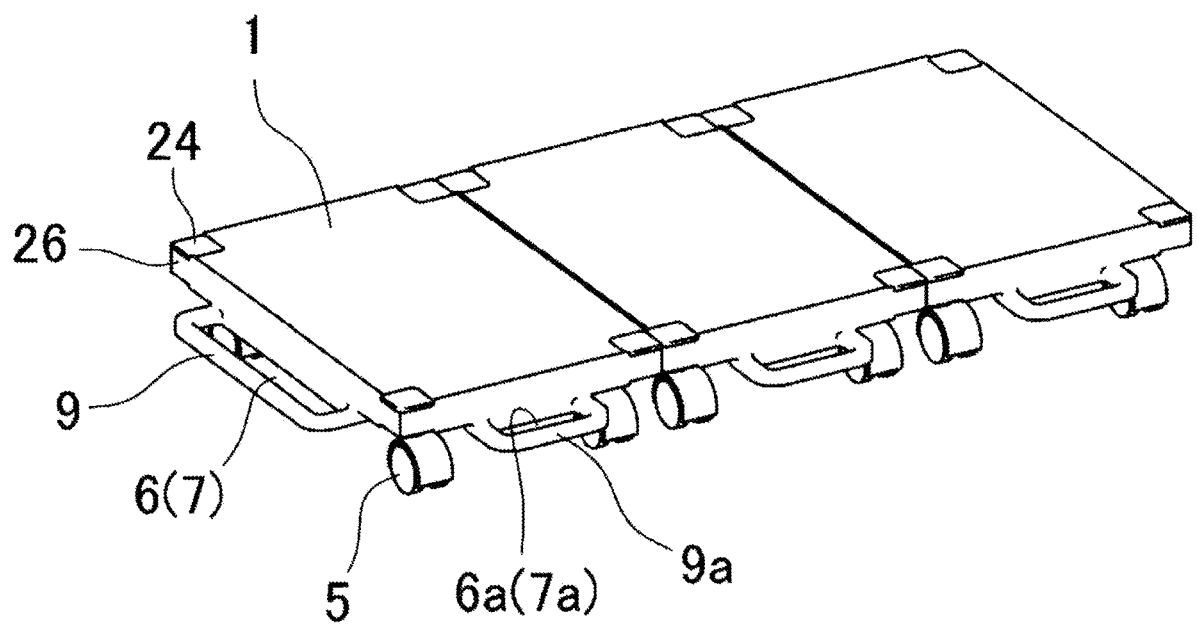
FIG. 7 is a view for illustrating a plurality of carriers connected together in a horizontal direction.

Further, as illustrated in FIG. 6, when the carriers 1 are connected in a vertical direction to form a multi-tier assembly with use of pillar members 22 and casters 5, the assembly can be used as a wagon with the handles 9, each having the engaged portion 6 serving as a finger insertion portion.

Figure 3:
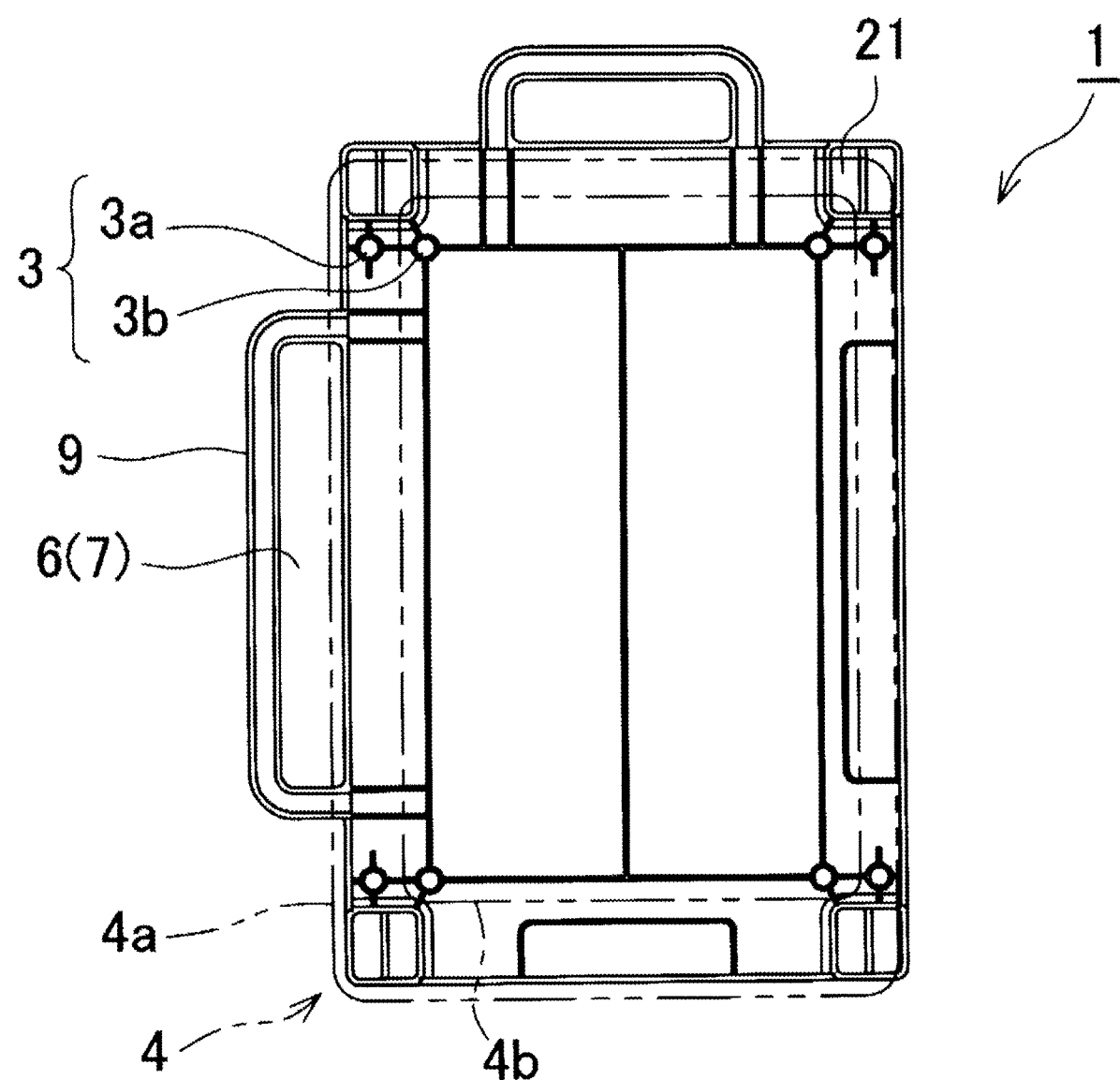
FIG. 3 is a bottom view of the carrier.
Figure 4:
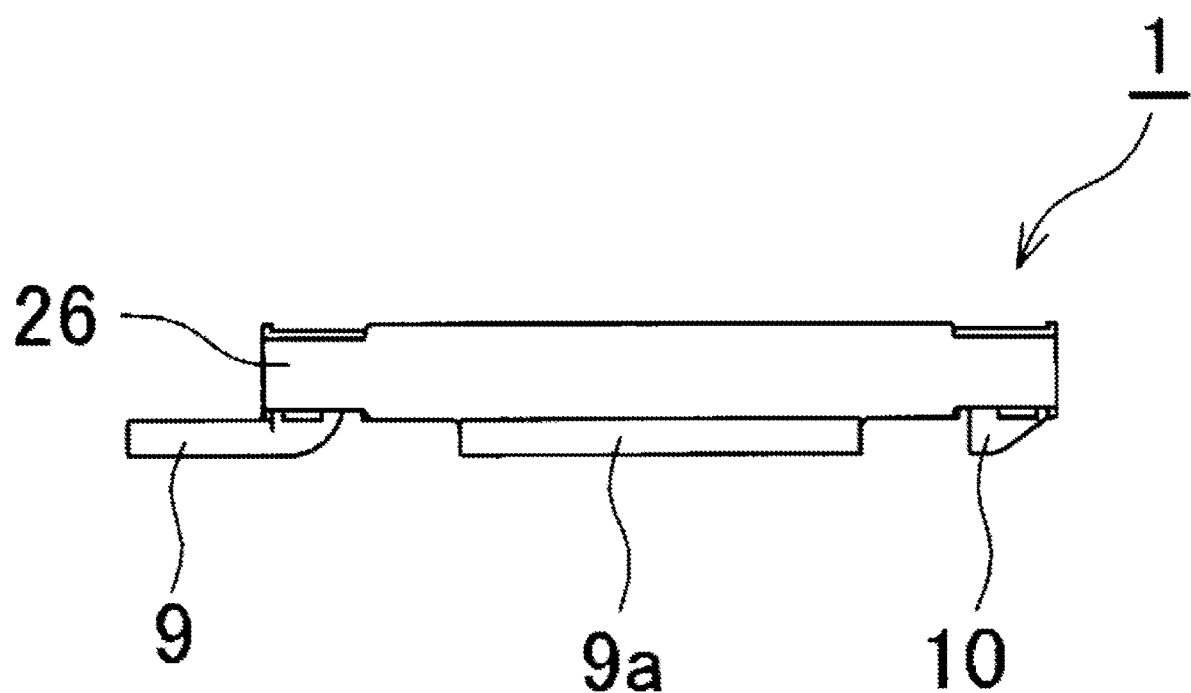
FIG. 4 is a side view of the carrier.

Further, as illustrated in FIG. 3, a plurality of elongated plate-shaped ribs may be formed on the lower surface of the load-carrying platform 2. The ribs may be formed to extend in a longitudinal direction, a transverse direction, or a diagonal direction of the load-carrying platform 2. The number and positions of the ribs are not limited. More specifically, each of the ribs is formed in a rectangular shape corresponding to a reduced similar figure of a peripheral edge of the load-carrying platform 2, and is located on an inner side of the engaging portion 10. Such formation of the ribs prevents deformation and breakage of the load-carrying platform 2 even when a load having a large weight is placed on the placement surface 28.

As illustrated in FIG. 1, each of the caster mounting portions 3 includes a first caster mounting portion 3a and a second caster mounting portion 3b, each having a mounting hole, formed on the lower surface of the load-carrying platform 2. As illustrated in FIG. 3, the carrier 1 includes a first caster mounting portion group 4a and a second caster mounting portion group 4b. The first caster mounting portion group 4a includes a set of the first caster mounting portions 3a that are formed on the lower surface of the load-carrying platform 2 and are arranged in a quadrangular pattern along the peripheral edge of the load-carrying platform 2. The second caster mounting portion group 4b includes a set of the second caster mounting portions 3b arranged in a quadrangular pattern on an inner side of the first caster mounting portion group 4a. In this embodiment, it is preferred that the second caster mounting portions 3b be formed at positions overlapping the rib having the rectangular shape.

When the casters 5 are mounted into the first caster mounting portion group 4a, a distance secured between the casters 5 on the load-carrying platform 2 of a single carrier 1 is larger than a distance secured between the casters 5 when the casters 5 are mounted in the second caster mounting portion group 4b. Thus, while the carrier 1 is being moved, high stability can be ensured.

When the casters 5 are mounted into the second caster mounting portion group 4b, wheels of the casters 5 can be prevented from projecting beyond the peripheral edge of the load-carrying platform 2 even in a case in which axis rotation of the caster 5 about its mounting shaft occurs. When the carrier 1 includes only the first caster mounting portion group 4a and does not include the second caster mounting portion group 4b, a distance from the peripheral edge of the load-carrying platform 2 to each of the casters 5 is small. As a result, when the carrier 1 with the casters 5 is viewed from above, the wheel of the caster 5 may project beyond the peripheral edge of the load-carrying platform 2 depending on an orientation of the wheel. In this case, when a plurality of carriers 1 are connected together, the casters 5 mounted into the first caster mounting portion groups 4a of the carriers 1 may collide against each other to prevent smooth turning of the carriers 1. The second caster mounting portion group 4b is located at a position closer to the center of the load-carrying platform 2 to allow free axis rotation of the casters 5 mounted to the carriers 1 when the carriers 1 are connected together, and thus enables smooth movement of the carriers 1 connected together.

As illustrated in FIG. 2, pillar vertical installation holes 20 are formed in four corners of the upper surface of the load-carrying platform 2. Specifically, a rib 27 is formed to extend in the middle of each of the pillar vertical installation holes 20. A shape of the rib 27 is not limited to the linear shape described above, and may be a cross-like shape or a diagonally extending shape. The pillar vertical installation hole 20 with the rib 27 achieves reliable coupling between the pillar member 22 and the load-carrying platform 2. Thus, when a load is placed on the placement surface 28, a force is equally exerted to the pillar members 22. Accordingly, instability of the carriers 1, which may be caused at a time of assembly, can be decreased.

Further, as illustrated in FIG. 5, when a plurality of carriers 1 are assembled in the vertical direction, the placement surface 28 of the load-carrying platform 2 of the carrier 1 located at an uppermost level can provide a flat surface by fitting caps 24, which correspond to the pillar vertical installation holes 20, into the pillar vertical installation holes 20 of the load-carrying platform 2 of the carrier 1 located at the uppermost position.

Pillar-head insertion holes 21 are formed on the lower surface of the load-carrying platform 2. Specifically, the rib 27 is formed to extend in the middle of each of the pillar-head insertion holes 21. A shape of the rib 27 is not limited to the linear shape described above, and may be a cross-like shape or a diagonally extending shape. It is preferred that the pillar-head insertion holes 21 be located immediately below the pillar vertical installation holes 20, respectively. This arrangement of the pillar-head insertion holes 21 enables the pillar members 22 to be arranged in vertical alignment when a plurality of carriers 1 are assembled.

The pillar-head insertion hole 21 with the rib 27 achieves reliable coupling between the pillar member 22 and the load-carrying platform 2. Thus, when a load is placed on the placement surface 28, a force is exerted equally to the pillar members 22. Accordingly, instability of the carriers 1, which may be caused at a time of assembly, can be decreased.

The pillar member 22 has one end (hereinafter referred to as "first end") to be fitted into a corresponding one of the pillar vertical installation holes 20 and another end (hereinafter referred to as "second end") to be fitted into a corresponding one of the pillar-head insertion holes 21. Distal ends of the pillar member 22 are each formed in a shape that allows insertion into the pillar vertical installation hole 20 and the pillar-head insertion hole 21, respectively. The shapes of the distal ends of the pillar member 22 allow fitting into a frame defining the pillar vertical installation hole 20 and a frame defining the pillar-head insertion hole 21.

As illustrated in FIG. 6, when a plurality of carriers 1 are assembled in the vertical direction, the first ends of the pillar members 22 can be fitted into the pillar vertical installation holes 20 of the load-carrying platform 2 of the carrier 1 arranged at a lower level, and the second ends of the pillar members 22 can be fitted into the pillar-head insertion holes 21 of the load-carrying platform 2 of the carrier 1 arranged at an upper level so as to connect the carriers 1 together. In this manner, the carriers 1 form a multi-tier assembly.

Figure 10:
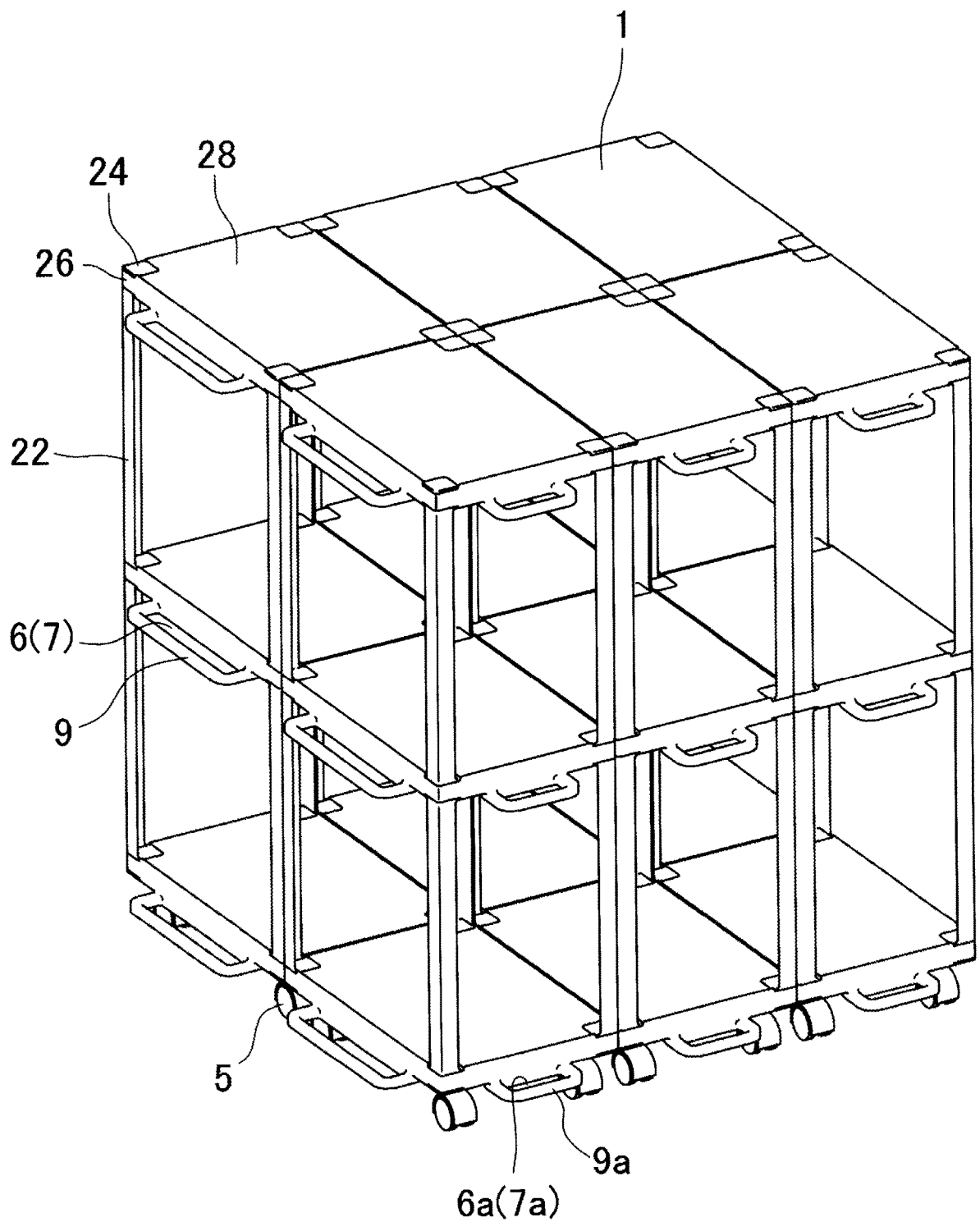
FIG. 10 is a view for illustrating a plurality of carriers connected together in the horizontal direction, the fore-and-aft direction, and the vertical direction.
Figure 16:
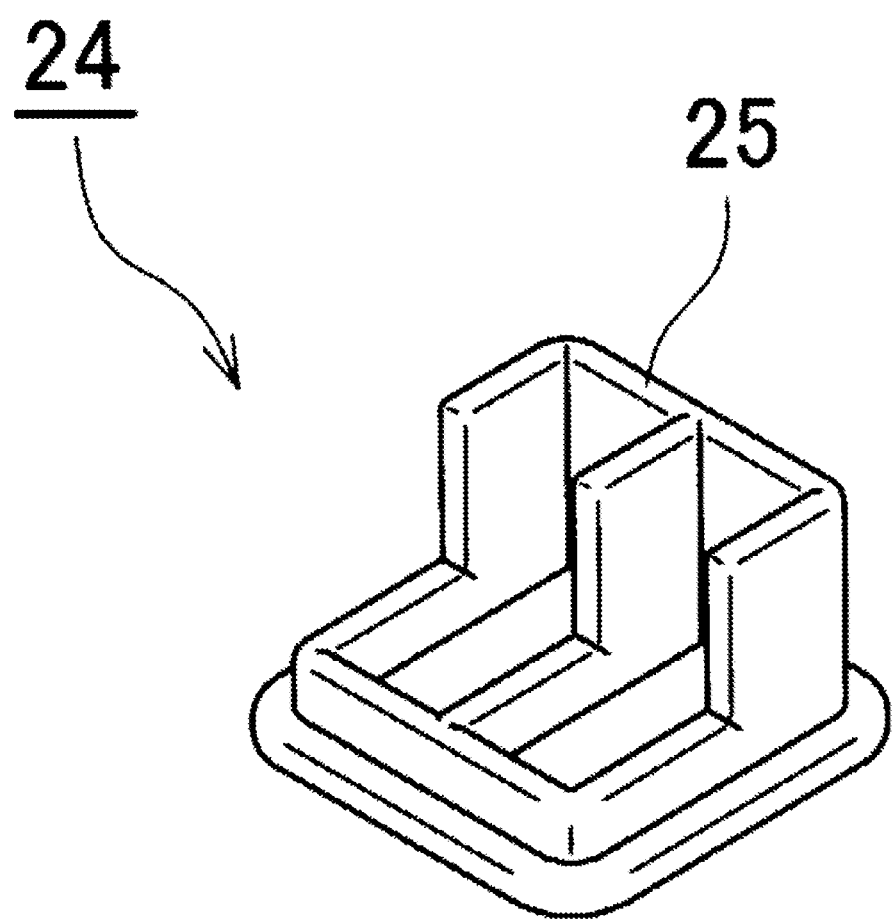
FIG. 16 is a view of the cap.

As illustrated in FIG. 16, the cap 24 has a protrusion 25 to allow fitting into the pillar vertical installation hole 20. Specifically, the cap 24 is a plate-shaped member having a rectangular shape. The cap 24 has a flat upper surface and a lower surface with the protrusion 25 formed thereon to allow fitting into the pillar vertical installation hole 20. The protrusion 25 has the same shape as a shape of a projecting portion 23 formed at each of the distal ends of the pillar member 22, which are fitted into the pillar vertical installation hole 20 and the pillar-head insertion hole 21, respectively. According to this disclosure, as illustrated in FIG. 10, the pillar vertical installation holes 20 can be covered with the caps 24. Thus, when a plurality of carriers 1 are assembled in the vertical direction and the pillar vertical installation holes 20 of the load-carrying platform 2 of the carrier 1 located at an uppermost level are covered with the caps 24, a flat surface can be provided without leaving recesses in the upper surface of the load-carrying platform 2 of the carrier 1 located at the uppermost level.

Figure 13:
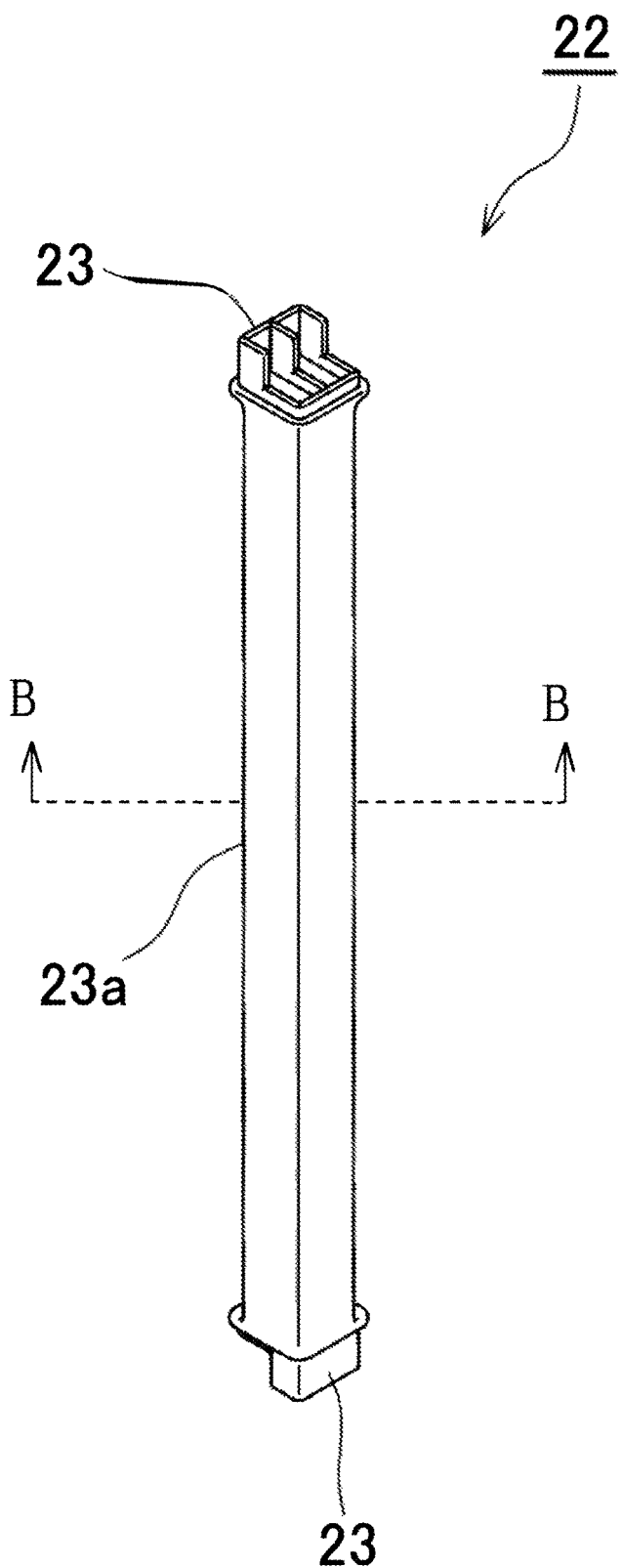
FIG. 13 is a view for illustrating the pillar member.
Figure 14A:
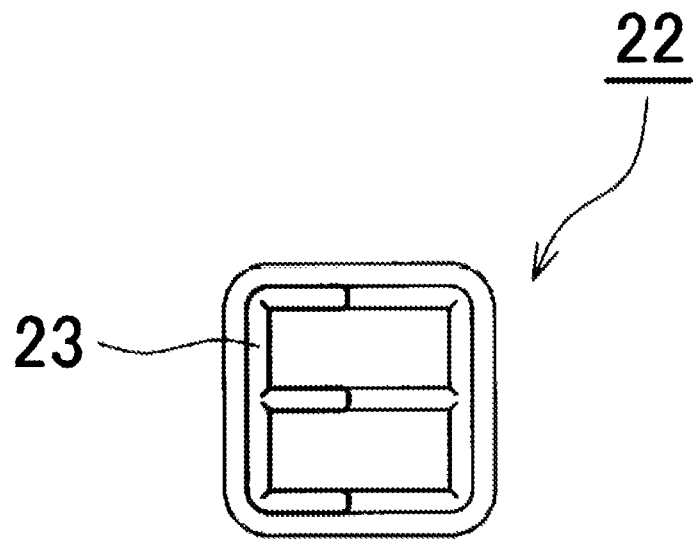
FIG. 14A is a top view of the pillar member.
Figure 14B:
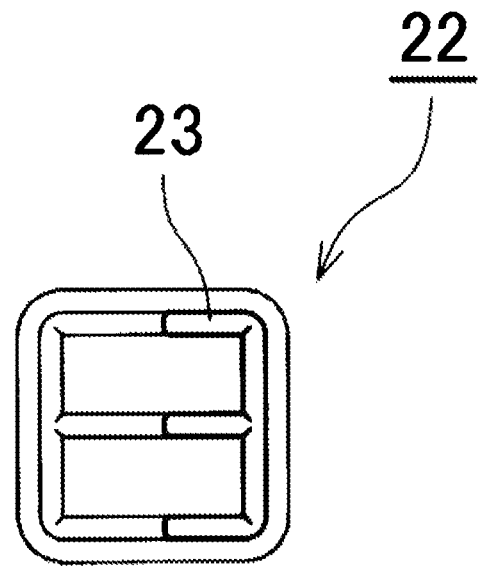
FIG. 14B is a bottom view of the pillar member.

Now, a method of assembling a plurality of carriers 1 according to the present invention in the vertical direction for use is described. First, the first ends of the pillar members 22 are fitted into the pillar vertical installation holes 20 formed in the four corners of the load-carrying platform 2 of the carrier 1 arranged at a lowermost level. In this embodiment, as illustrated in FIG. 2, the rib 27 is formed to extend in the middle of each of the pillar vertical installation holes 20. For example, as illustrated in FIG. 13, the first end of the pillar member 22 has a rectangular shape slightly smaller than the frame defining the pillar vertical installation hole 20, and has the projecting portion 23 formed on any one of a right side and a left side with respect to a middle line of its cross section so as to be fittable into any one of two spaces separated by the rib 27 in the pillar vertical installation hole 20. Meanwhile, as illustrated in FIG. 14A and FIG. 14B, the second end of the pillar member 22 has the projecting portion 23 formed to be mirror-symmetric to the first end of the pillar member 22.

Figure 15:
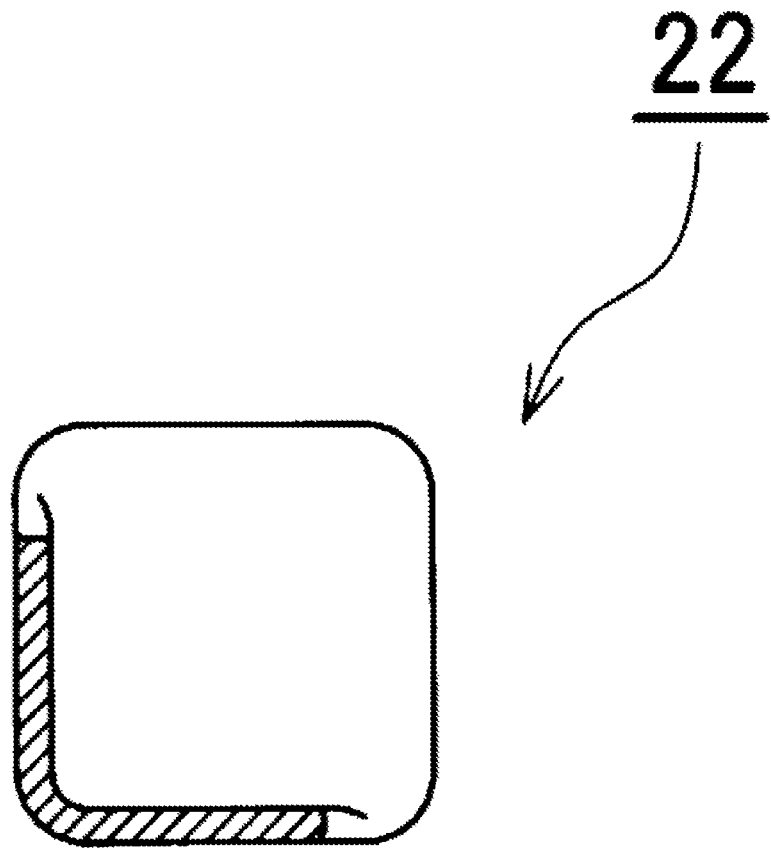
FIG. 15 is a sectional view taken along the line B-B of FIG. 13.
Figure 17:
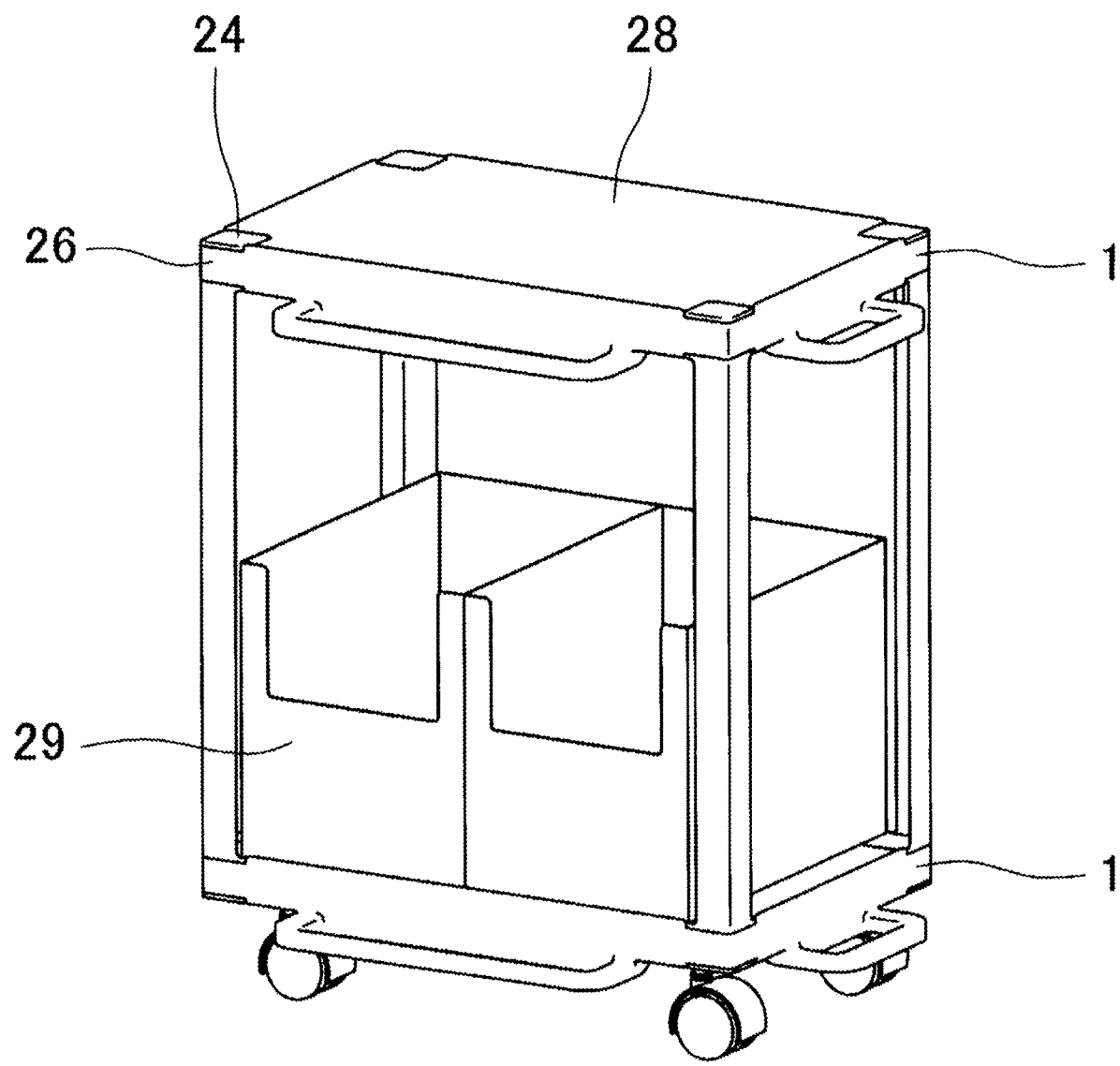
FIG. 17 is a view for illustrating a state in which boxes are placed on the placement surface.

Each of the pillar members 22 has a shaft portion 23a. As illustrated in FIG. 15, the shaft portion 23a is formed to have a substantially L-like cross section. The first ends of the pillar members 22 are fitted into the pillar vertical installation holes 20 of the load-carrying platform 2 of the carrier 1 arranged at an upper level, and the second ends of the pillar member 22 are fitted into the pillar-head insertion holes formed on the load-carrying platform 2 of the carrier 1 arranged at a lower level to thereby assemble the carriers 1 in the vertical direction. Then, as illustrated in FIG. 17, when a set of boxes 29, which has substantially the same rectangular shape as that of the placement surface 28, is placed on the placement surface 28 of the load-carrying platform 2 of the carrier 1 arranged at the lower level, lateral sides of each of four corners of the set of boxes 29 placed on the placement surface 28 and adjacent two sides of a corresponding one of the pillar members 22 are brought into contact with each other. Thus, the boxes 29 can be placed without being obstructed by the pillar members 22.

Next, after the first ends of the pillar members (referred to as "lower-level pillar members") 22 are inserted into the pillar vertical installation holes 20 of the load-carrying platform 2 of the carrier 1 arranged at the lower level, the second ends of the lower-level pillar members 22 are inserted into the pillar-head insertion holes 21 of the load-carrying platform 2 of the carrier 1 arranged at the upper level. Further, the first ends of the pillar members (referred to as "upper-level pillar members") 22 are inserted into the pillar vertical installation holes 20 of the load-carrying platform 2 of the carrier 1 arranged at the upper level. In this case, as illustrated in FIG. 10, the pillar vertical installation hole 20 and a corresponding one of the pillar-head insertion holes 21, which is formed immediately below the pillar vertical installation hole 20, form a single integral hole. Thus, the second end of the lower-level pillar member 22 and the first end of the upper-level pillar member 22 are fitted into two spaces in the single integral hole, which is separated by the rib 27, respectively. The pillar vertical installation hole 20 and the pillar-head insertion hole 21 are formed to receive two ends of the pillar member 22, respectively. Thus, both ends of the pillar member 22 are closely fitted into the pillar vertical installation hole 20 and the pillar-head insertion hole 21 without leaving a gap, respectively. As a result, when the carriers 1 are assembled with use of the pillar members 22 as illustrated in FIG. 6, there is a reduced possibility that the pillar members 22 may sway, improving stability.

Next, how to use the cap 24 is described. For example, as illustrated in FIG. 16, the cap 24 has the protrusion 25 having the same shape as the shape of any one of the projecting portions 23 formed at the ends of the pillar member 22. As an example of use, the second ends of the pillar members 22 are fitted into the pillar-head insertion holes 21 of the load-carrying platform 2 of the carrier 1 located at an uppermost level. The caps 24 are fitted into the pillar vertical installation holes 20 into which the pillar members 22 are not required to be fitted. The cap 24 is fitted in such a manner that an outer frame of the cap 24 is fitted inside the frame defining the pillar vertical installation hole 20 without leaving a gap. As a result, as illustrated in FIG. 10, when the carriers 1 are assembled together with use of the pillar members 22, the load-carrying platform 2 of the carrier 1 located at the uppermost position provides a flat surface without recesses.

Figure 12:
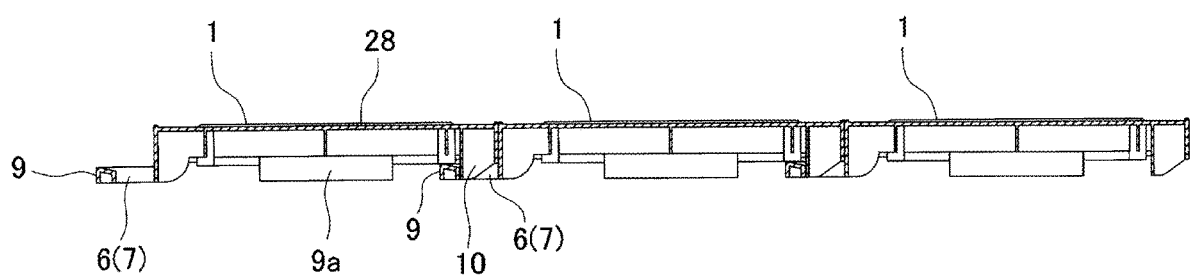
FIG. 12 is a sectional view taken along the line A-A of FIG. 11.

Now, a method of connecting the carriers 1 according to the present invention together in the horizontal direction for use is described. The load-carrying platform 2 having a plate-like shape is provided with the handle 9 and the engaging portion 10. The handle 9 has the engaged portion 6, and extends outward beyond the lower end of one of the side surfaces 26. The engaging portion 10 projects downward beyond the lower end of the side surface 26 opposed to the side surface 26 with the handle 9. The engaging portion 10 of the carrier 1 is engaged with the through hole 7 being the engaged portion 6 of the handle 9 of another carrier 1 placed adjacent thereto. As illustrated in FIG. 12, the engaging portion 10 is formed slightly smaller than the through hole 7 being the engaged portion 6. The engaging portion 10 having such a size allows engagement with the engaged portion 6 without moving inside the engaged portion 6 when the carriers 1 are connected together.

Further, the handle 9 having the engaged portion 6 extends outward from the lower end of the side surface 26 of the load-carrying platform 2, and the engaging portion 10 projects from the lower surface of the load-carrying platform 2. As a result, the side surfaces 26 of the load-carrying platform 2 are formed flat. As illustrated in FIG. 12, the engaging portion 10 of the carrier 1 is engaged with the engaged portion 6 of the carrier 1 being adjacent thereto to bring the side surfaces 26 of the load-carrying platforms 2 of the carriers 1, which are opposed to each other, into contact with each other to connect the carriers 1 together without leaving a gap.

Figure 11:
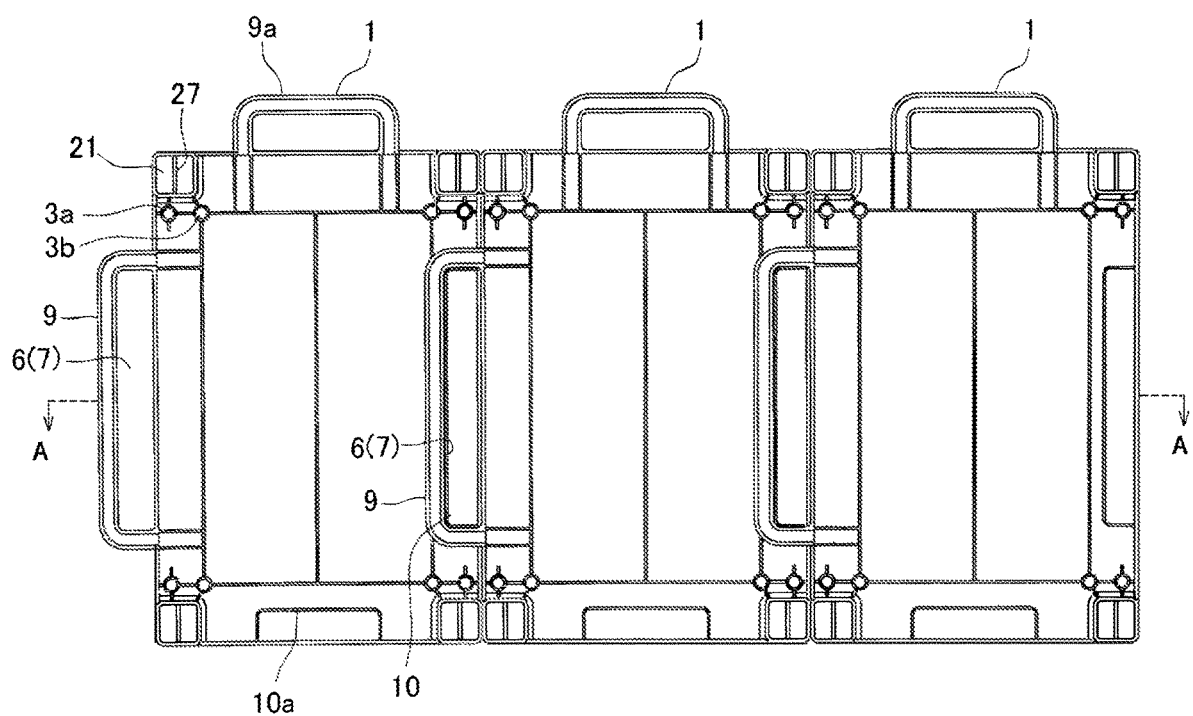
FIG. 11 is a bottom view of the plurality of carriers connected together in the horizontal direction.

Further, as illustrated in FIG. 8, the second engaging portion 10a (depicted in FIGS. 1 and 11) formed to extend beyond one side surface of the load-carrying platform 2 of the carrier 1 can be engaged with the second engaged portion 6a of another carrier 1. Such engagement enables connection of the carriers 1 in the fore-and-aft direction and the horizontal direction.

In the present invention, the carrier is not limited to that described in the embodiment. The carrier may be changed in various modes within the scope of the present invention in accordance with aims and purposes of use.

For example, the handle 9 may extend horizontally from a position slightly above the lower end of the side surface 26.

In this case, a cutout is formed in the side surface 26 opposed to the surface 26 with the handle 9. The cutout extends upward from a position at a lower end, which is located below a position corresponding to the handle 9, and has such a width that allows insertion of the handle 9. The engaging portion 10 is formed on the lower surface of the load-carrying platform 2 so as to be located on the inner side of the cutout. This structure enables connection of a plurality of carriers 1.

Further, the pillar vertical installation hole 20 and the pillar-head insertion hole 21 located immediately below the pillar vertical installation hole 20 are not required to be formed continuously. The pillar vertical installation hole 20 and the pillar-head insertion hole 21 may be formed as separate grooves oriented upward and downward, respectively.

The shapes of the projecting portions 23 of the pillar member 22, the pillar vertical installation hole 20, the pillar head-insertion hole 21, and the protrusion 25 of the cap 24 are not limited to those described in the embodiment. When there is a correspondence among the above-mentioned portions, the shapes of the portions may be suitably changed.

What is claimed is:

1. A carrier, comprising:
   a load-carrying platform having a plate-like shape with a flat upper surface;
   caster mounting portions formed on a lower surface of the load-carrying platform;
   a handle that extends outward from a first side edge portion of the load-carrying platform, and has an upper surface with an engaged portion being one of a recess and a through hole; and
   an engaging portion that projects downward from a lower surface of a second side edge portion opposed to the first side edge portion of the load-carrying platform and is engageable with the engaged portion, wherein:
   the engaging portion projects downward beyond the lower end of the second side surface; and
   the engaging portion comprises a tapered incline, with the longest projection of the engaging portion proximate the center of the load-carrying platform and the shortest projection of the engaging portion proximate the second side surface.

2. The carrier according to claim 1,
   wherein the load-carrying platform has pillar vertical installation holes formed on the upper surface and pillar-head insertion holes formed on the lower surface, and
   wherein the pillar vertical installation holes and the pillar-head insertion holes enable construction of a multi-tier assembly with use of pillar members.

3. The carrier according to claim 2, wherein the pillar vertical installation holes of the load-carrying platform are closable by caps.

4. The carrier according to claim 1, further comprising:
   a second handle that extends outward from a third side edge portion that is perpendicular to the first side edge portion with the handle and a horizontal plane including the upper surface of the load-carrying platform when viewed from a center of the horizontal plane; and
   a second engaging portion that projects downward from a lower surface of a fourth side edge portion opposed to the third side edge portion.

5. The carrier according to claim 1, wherein the caster mounting portions are classified into:
   a first caster mounting portion group including first caster mounting portions arranged in a quadrangular pattern along a peripheral edge of the load-carrying platform; and
   a second caster mounting portion group including second caster mounting portions arranged in a quadrangular pattern on an inner side of the first caster mounting portion group.

\* \* \* \* \*

UNITED STATES PATENT AND TRADEMARK OFFICE
CERTIFICATE OF CORRECTION

| | | |
|---|---|---|
| PATENT NO. | : 11,760,401 B2 | Page 1 of 1 |
| APPLICATION NO. | : 17/519939 | |
| DATED | : September 26, 2023 | |
| INVENTOR(S) | : Chang et al. | |

It is certified that error appears in the above-identified patent and that said Letters Patent is hereby corrected as shown below:

On the Title Page

Column 1, please add item (30):
Japan JP2021-111121 07/02/2021

Signed and Sealed this
Second Day of April, 2024

*Katherine Kelly Vidal*

Katherine Kelly Vidal
*Director of the United States Patent and Trademark Office*